United States Patent
Safari-Zadeh et al.

(10) Patent No.: US 9,634,595 B2
(45) Date of Patent: Apr. 25, 2017

(54) METHOD AND A GENERATOR SYSTEM FOR OPERATING A GENERATOR

(71) Applicant: ALSTOM Technology Ltd, Baden (CH)

(72) Inventors: Immanuel Safari-Zadeh, Othmarsingen (CH); René Wilhelm Schaefer, Suhr (CH)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 14/872,656

(22) Filed: Oct. 1, 2015

(65) Prior Publication Data
US 2016/0105136 A1    Apr. 14, 2016

(30) Foreign Application Priority Data

Oct. 9, 2014   (EP) ..................................... 14188293

(51) Int. Cl.
| | |
|---|---|
| *H02P 9/10* | (2006.01) |
| *H02P 9/14* | (2006.01) |
| *H02P 9/00* | (2006.01) |
| *H02P 9/30* | (2006.01) |
| *H02K 7/02* | (2006.01) |

(Continued)

(52) U.S. Cl.
CPC ............... *H02P 9/00* (2013.01); *H02K 7/025* (2013.01); *H02P 9/102* (2013.01); *H02P 9/302* (2013.01)

(58) Field of Classification Search
USPC .................. 322/10, 86, 94; 290/46
See application file for complete search history.

(56) References Cited

U.S. PATENT DOCUMENTS

| | | | | |
|---|---|---|---|---|
| 4,743,777 A | * | 5/1988 | Shilling .................. | F02N 11/04 290/31 |
| 4,939,441 A | * | 7/1990 | Dhyanchand ........... | F02N 11/04 290/46 |

(Continued)

FOREIGN PATENT DOCUMENTS

| | | |
|---|---|---|
| EP | 0 122 310 A1 | 10/1984 |
| EP | 2 288 017 B1 | 2/2011 |
| EP | 2 293 432 A1 | 3/2011 |

OTHER PUBLICATIONS

Roe, "Boeing Flywheel Energy Storage Technology", Alaska Energy Storage Workshop, Jun. 2012, retrieved from https://www.uaf.edu/files/acep/BoeingFlywheelOverview_06_20_2012.pdf, 2012.

(Continued)

*Primary Examiner* — Pedro J Cuevas
(74) *Attorney, Agent, or Firm* — GE Global Patent Operation; Rita D. Vacca

(57) ABSTRACT

The present disclosure relates to a method and a generator system for operating a generator. The method for operating the generator includes exciting the field winding of a rotor of the generator by a first exciter device, driving a second exciter device while operating the generator with the first exciter device, and switching the second exciter device to excite the generator in case the first exciter device feeds to the generator not sufficient energy for operating the generator during a malfunction of the first exciter device. Further, a corresponding generator system is described.

11 Claims, 3 Drawing Sheets

(51) Int. Cl.
*H02P 3/00* (2006.01)
*H02P 9/06* (2006.01)

(56) References Cited

U.S. PATENT DOCUMENTS

| | | | | |
|---|---|---|---|---|
| 5,068,590 | A * | 11/1991 | Glennon | F02N 11/04 290/38 R |
| 5,097,195 | A * | 3/1992 | Raad | F02N 11/04 290/38 R |
| 5,283,471 | A * | 2/1994 | Raad | F02N 11/04 290/31 |
| 5,289,107 | A * | 2/1994 | Radun | H02P 9/40 318/696 |
| 5,404,091 | A | 4/1995 | Radun | |
| 5,430,362 | A * | 7/1995 | Carr | F02N 11/04 318/139 |
| 5,444,349 | A * | 8/1995 | Rozman | F02N 11/04 318/400.41 |
| 5,493,200 | A * | 2/1996 | Rozman | H02P 9/08 322/10 |
| 5,594,322 | A * | 1/1997 | Rozman | F02N 11/04 318/400.12 |
| 5,747,971 | A * | 5/1998 | Rozman | H02P 9/02 318/801 |
| 6,844,707 | B1 * | 1/2005 | Raad | F02N 11/04 290/46 |
| 7,508,086 | B2 * | 3/2009 | Huang | F02N 11/04 290/31 |
| 7,821,145 | B2 * | 10/2010 | Huang | F02N 11/04 290/31 |
| 8,319,481 | B2 * | 11/2012 | Lemmers | H02P 9/302 322/59 |
| 8,928,293 | B1 * | 1/2015 | Rozman | H02P 9/14 290/31 |
| 9,508,479 | B1 * | 11/2016 | Buskirk | H01F 13/003 |
| 2007/0222220 | A1 * | 9/2007 | Huang | F02N 11/04 290/31 |
| 2007/0296275 | A1 | 12/2007 | Joho | |
| 2008/0150494 | A1 * | 6/2008 | Lemmers | H02P 9/302 322/6 |
| 2009/0174188 | A1 * | 7/2009 | Huang | F02N 11/04 290/46 |
| 2016/0372245 | A1 * | 12/2016 | Buskirk | H01F 13/006 |

OTHER PUBLICATIONS

Arseneaux, "20MW Flywheel Frequency Regulation Plant", 2014 DOE OE Energy Storage Program Peer Review and Update Meeting, retrieved from http://www.sandia.gov/ess/docs/pr_conferences/2014/Thursday/Session7/02_Areseneaux_Jim_20MW_Flywheel_Energy_Storage_Plant_140918.pdf , 2014.

* cited by examiner

METHOD AND A GENERATOR SYSTEM FOR OPERATING A GENERATOR

CROSS-REFERENCE TO RELATED APPLICATIONS

This application claims priority to European Patent Application No. 14188293.6 filed Oct. 9, 2014, the contents of which are hereby incorporated in its entirety.

TECHNICAL FIELD

The present disclosure relates to a method and a generator system for operating a generator.

The generator generates high power and is to be connected to a gas or steam turbine, denominated as turbogenerator, or a synchronous generator to be connected to a hydro turbine, denominated as hydro generator.

BACKGROUND

Static exciters are widely used for feeding the field winding of electric generators.

US2007/0296275 discloses, with reference to FIG. 1 of this document, a static exciter having an exciter transformer that is connected at one side to a busbar of a generator, i.e. to the output of the generator, and at the other side to a rectifier that converts the AC voltage fed from an exciter transformer into a direct current (DC) voltage.

The rectifier is typically driven by an Automatic Voltage Regulator (AVR) that is connected to the busbar via a voltage transformer.

The DC side of the rectifier is connected in series with the field winding of the generator and a forward biased diode.

The forward biased diode is connected in parallel with a capacitor bank. Moreover, a switch is provided between the capacitor bank and the diode, such switch can be closed to connect the capacitor bank in series with the rectifier.

During normal operation the switch is open, the alternating current (AC) voltage from the exciter transformer is converted into a DC voltage and is fed to the field winding because the diode is forward biased and conducts current.

In case a disturbance at the grid occurs, for example due to a short circuit in the transmission line, the voltage of the grid drops and, therefore, also the voltage of the busbar and the voltage at the lower voltage side of the voltage transformer drops. These disturbances are especially an issue with the recent rising of renewable energies feeding the electric grid and the corresponding higher requirements to grid safety.

When the voltage at the lower voltage side of the voltage transformer drops below a prefixed voltage value, the switch is closed such that the diode is reverse biased and does not conduct anymore, and the capacitor bank is connected in series with the rectifier and field winding.

This causes a considerably higher field voltage to be applied to the field winding and guarantees the stability of the generator/grid system.

Nevertheless, once a disturbance occurs, the capacitor bank is fully discharged, therefore if a plurality of disturbances occurs the system is not able to cope with.

In fact, even if the static exciter is provided with a charging device such as a battery that keeps the capacitor bank charged, the charging device dimension is usually small and it takes minutes to hours for it to recharge the capacitor bank to an acceptable charge level.

The document EP 2288017 B1 describes a static exciter of a field winding of an electric generator comprising a rectifier connected to an electric grid and to the field winding of the electric generator, an unidirectional electronic switch connected in series with the rectifier, and a capacitor bank. The static exciter further comprises a switch between the unidirectional electronic switch and the capacitor bank connected to a control unit that closes it when a voltage indicative of the grid voltage drops below a first prefixed voltage value to connect the capacitor bank to the field winding. The control unit opens said switch when a voltage indicative of the grid voltage exceeds a second prefixed voltage value to disconnect the capacitor bank from the field winding, such that the capacitor bank supplies energy to the field winding only for the time needed.

However, the solutions described in the state of the art are complex, require installation space, and are expensive.

SUMMARY

It is an object of the invention to provide a cost efficient and reliable solution for an excitation of a generator during failures in the electric grid.

This object is solved by the method and the generator system according to the independent claims.

Compared to the state of the art the invention has a lower reaction power consumption from the electrical grid, has lower voltage peaks at the excitation field winding, and lower harmonic frequencies versus the electrical grid.

Further examples of the invention are described in the dependent claims.

BRIEF DESCRIPTION OF THE DRAWINGS

Further characteristics and advantages will be more apparent from the description of a preferred but non-exclusive embodiment of the method and the generator system, illustrated by way of non-limiting example in the accompanying drawings, in which.

DETAILED DESCRIPTION

Figure 1:
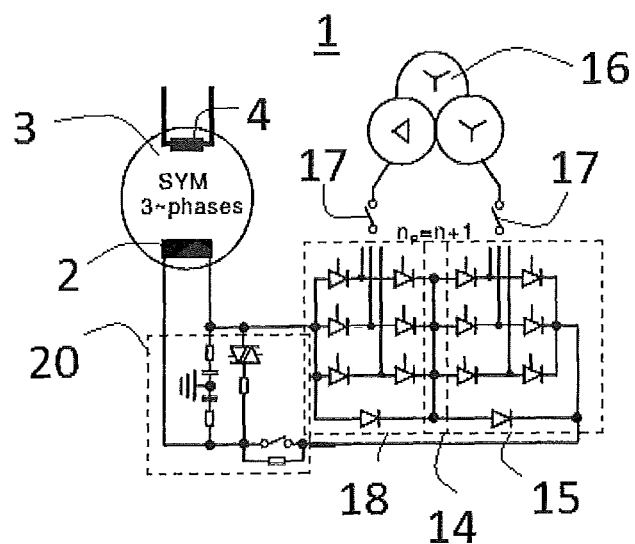
FIG. 1 shows a block diagram of a circuit arrangement of a generator system with a generator, a first exciter device, a de-excitation unit, an excitation unit, and an excitation transformer.

With reference to the figures, these show examples of the invention, wherein like reference numerals designate identical or corresponding parts throughout the several views.

FIG. 1 shows a block diagram of a circuit arrangement of a generator system 1. Shown in a schematic way is a generator 3 suitable for generating high power, commonly fed with compressed and heated gas or steam by a steam or gas turbine and denominated as a turbogenerator. The synchronous generator 3 commonly includes a field winding 2 wound around the rotor of the generator 3 creating a coil. The field winding 2 usually excites the rotor in a synchronous machine, i.e. creates a magnetic field which induces a voltage in the stator of the generator. Here, the generator 3 is a synchronous machine (SYM) which is designed as a three phase generator 3 for generating a three phase alternating current (AC). The invention is also applicable to other configurations, as one phase, two phase, or direct current (DC). The generator 3 is connected via a de-excitation unit 20 with an excitation unit 14. The de-excitation unit 20 essentially comprises a branch with two capacities connected in series with two resistors. This branch is connected in parallel to the field winding 2 and to a second branch with a resistor connected in series with two reverse-connected thyristors. In this example according to FIG. 1 the excitation unit 14 comprises a main excitation unit 15 and a ceiling excitation unit 18. The de-excitation unit 20 is connected in parallel to the excitation unit 14. The excitation unit 14 comprises a ceiling excitation unit 18 and a main excitation unit 15 which are basically designed the same. The ceiling excitation unit 18 and the main excitation unit 15 each comprise a circuitry of six thyristors connected in parallel, and each a diode connected in parallel to the each six thyristors. An excitation transformer 16 is connected to the excitation unit 14 via switches 17 as can be seen in FIG. 1. The excitation transformer 16 is designed as a circuitry with two star connections and one delta connection in this example. The excitation transformer 16 is connected via a switch 17 with the ceiling excitation unit 18 and via another switch 17 connected with the main excitation unit 15, each with the three branches of the thyristor bridges representing three phases.

Figure 2:
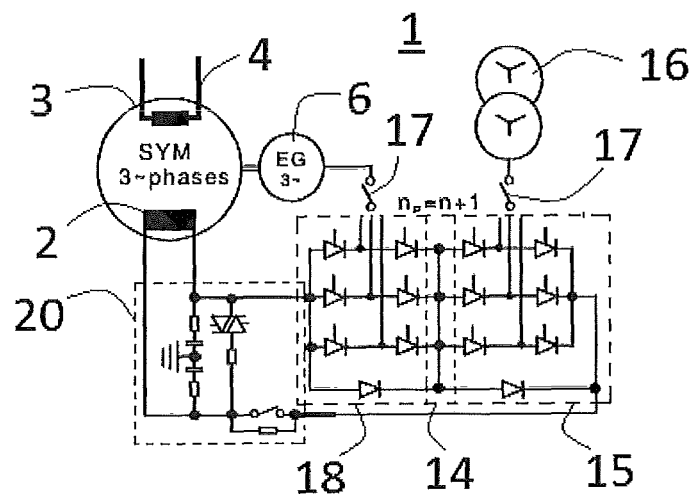
FIG. 2 shows a block diagram similar to FIG. 1 with a second exciter device next to the first exciter device, the second exciter device connected to the generator and the excitation unit according to an example of the invention.

FIG. 2 shows a block diagram of a generator system 1 similar to FIG. 1. Here, the excitation transformer 16 is designed with two star connections and is connected to the main excitation unit 15, with each branch of the thyristor bridge of the main excitation unit 15. In FIG. 2 a second exciter device 6 next to a first exciter device 4 is connected to the generator 3 and to the ceiling excitation unit 18. The first exciter device 4 is commonly fed by the electrical grid, the field winding 2 is excited by a voltage. Therefore, the excitation of the generator system 1 is stable while the electrical grid provides a stable voltage. The excitation transformer 16 is connected to the first exciter device 4 (not shown). In regular operation of the generator 3 and the electric grid to which the generator 3 is connected the right switch 17 is closed. Thus, the excitation transformer 16 controls the generator 3 via the main excitation unit 15. In this common operation mode the ceiling excitation unit 18 is not active, the left switch 17 closing the electric circuit of the second exciter device 6 and the generator 3 is open. This means in the regular operation mode the second exciter device 6, which is an excitation generator in this example, is running and generating electrical power but is not connected with the generator 3. The second exciter device 6 can be realized with an output power of approximately 30 kW. Further output powers of the second exciter device 6 suitable to excite the generator 3 can be provided. Then, the field winding 2 of the generator 3 is not excited by the second exciter device 6. In common operation mode, without an electric grid failure and interruptions, the second exciter device 6 is permanently turned on and providing electrical energy. The field excitation of the generator 3 to be operated on the electric grid however is created by the first exciter device in a common way of the state of the art, usually the voltage of the first exciter device is provided by the electrical grid. The first exciter device 4 provides the voltage for the field winding 2 as long as the electrical grid is not interrupted and the main excitation unit 18 is connected to the generator 3.

Figure 3:
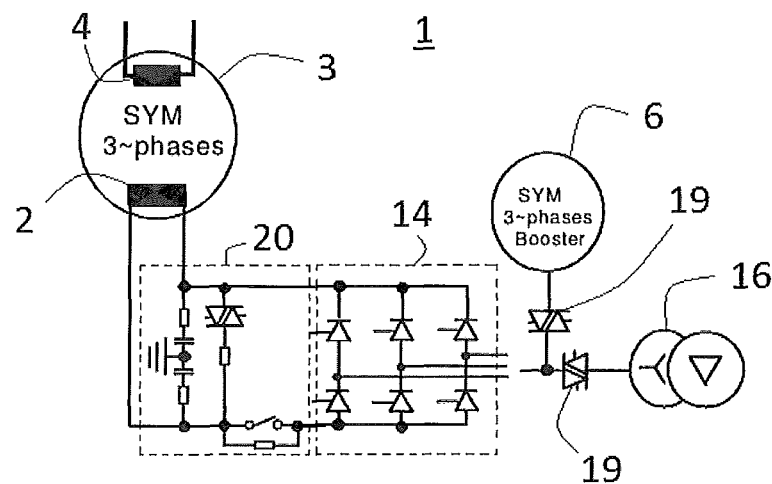
FIG. 3 shows a block diagram of a circuit arrangement of a generator system with an excitation unit and a second exciter device designed as a synchronous three phase booster to excite the generator via the excitation unit.

FIG. 3 shows a block diagram of a circuit arrangement of a further example of the generator system 1. In this example the excitation unit 14 is not separated in a main and ceiling excitation unit. The de-excitation unit 20 is identical to the de-excitation unit 20 of FIGS. 1 and 2. In FIG. 3 the second exciter device 6 is designed as a synchronous motor with three phases. The second exciter device 6 is connected to the excitation unit 14 and the excitation transformer 16 via two reverse connected thyristors, a thyristor circuit 19. The excitation transformer 16 is connected to the excitation unit 14 via two reverse connected thyristors, a thyristor circuit 19, in this example instead of a switch 17. As in the examples above all three phases of the excitation unit 14 are connected with the second exciter device 6 and the excitation transformer 16. Again, the second exciter device 6 is in continuous operation, both in regular operation and in interrupted operation of the first exciter device 4 exciting the generator 3. In case of an interruption of the electrical grid operating the first exciter device 4 the thyristor circuits 19 are fired and as a result the second exciter device 6 is connected to the field winding 2 of the generator 3. The thyristor circuit 19 connecting the second exciter device 6 with the generator 3 opens the connection and the thyristor circuit 19 connecting the first exciter device 4 via the excitation transformer 16 with the generator 3 is closed. Then, the second exciter device 6 excites the field winding 2 instead of the first exciter device 4. This operation mode of excitation by the second exciter device 6 is maintained as long as there are interruptions in the electrical grid from which the generator 3 is supplied in common operation mode.

Figure 4:
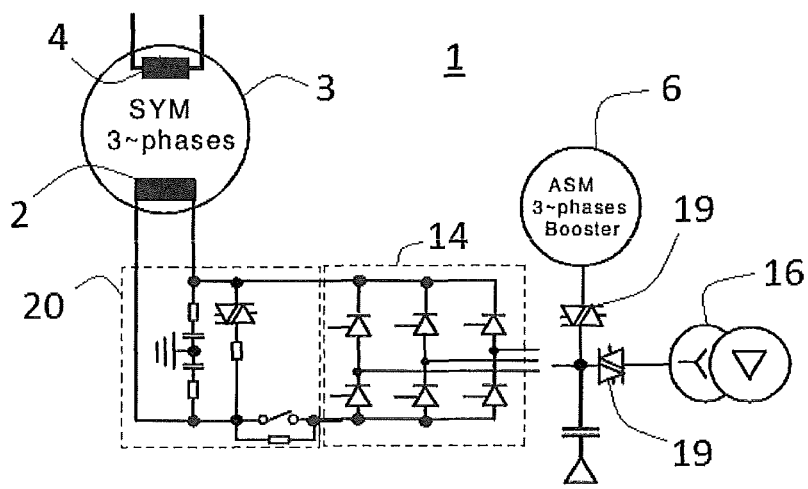
FIG. 4 shows a block diagram of a circuit arrangement similar to FIG. 3 with an asynchronous three phase booster instead of a synchronous booster as a second exciter device.

FIG. 4 shows a block diagram of a circuit arrangement of a generator system 1 similar to FIG. 3. In this example the second exciter unit 6 is realized as an asynchronous motor with three phases, namely an asynchronous three phase booster instead of a synchronous booster. In addition, a capacity connected in series with a diode is connected to the second exciter device 6 and to the excitation transformer 16. In an alternative solution the second exciter device 6 operates a unipolar generator with a voltage of approximately 0.8 kV and a direct current (DC) of approximately 6 kA to excite the generator 3. The asynchronous motor according to the example of FIG. 4 is then designed as a low power motor to drive the unipolar generator. Empirically, the electrical grid failures occur only for a short time, so the second exciter device 6 operates only for short time durations. A unipolar generator is capable of providing a high power in relation to the motor driving the unipolar generator for a short time, so this configuration is particularly useful for the generator system 1 to reduce the energy consumption of the generator system 1. Similar to this alternative example the second exciter device 6 can comprise a flywheel for storing mechanical energy. The flywheel is driven by a motor, in FIG. 4 an asynchronous motor, and during operation of the generator 3 the flywheel rotates, which means a mechanical energy is stored and can be used in case it is needed. The need for this stored energy arises again in case of a malfunction of the generator 3. The flywheel can be manufactured from steel or carbon fibre, especially from carbon nano fibre. The flywheel can be housed in a near vacuum environment to increase the efficiency, i.e. reduce the power to move the flywheel. The near vacuum is provided by a proper vacuum pump. Alternatively to a mechanical bearing the flywheel can be manufactured with a magnetic bearing which is here advantageous because little bearing maintenance is needed. The rotating flywheel is levitated through the force of a magnetic field, both a permanent magnetic field and a controlled magnetic field generated by electromagnets for the adjustment and centering of the bearing. This is useful for the long-term operation of a generator 3 in a power plant and the corresponding long-term operation of the second exciter device 6.

Figure 5:
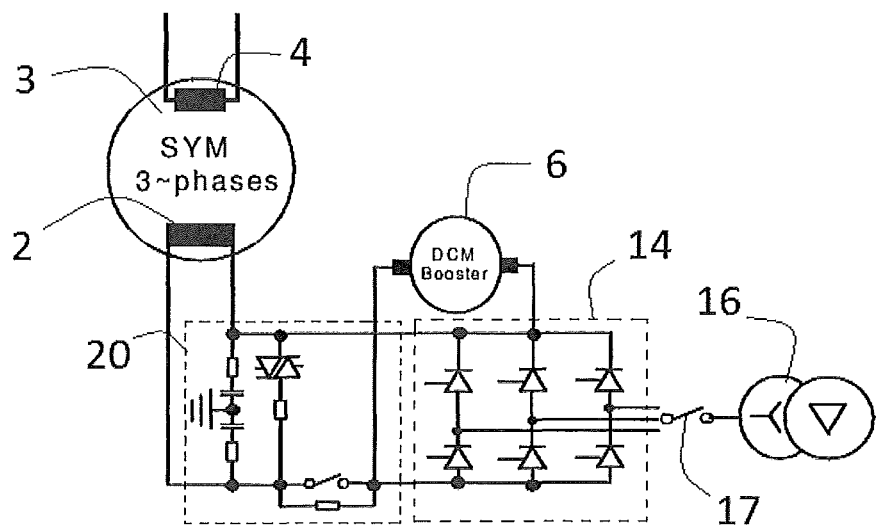
FIG. 5 shows a block diagram of a circuit arrangement of a generator system with a direct current motor as a second exciter device.

FIG. 5 shows a block diagram of a circuit arrangement of a generator system 1 according to another example of the invention. The excitation transformer 16 is connected to the excitation unit 14 via a switch 17. The second exciter device 6 is designed as a direct current motor (DCM), a DC motor booster. The second exciter device 6 is connected to the de-excitation unit 20 and to the excitation unit 14. Similar to the previous examples of the invention the second exciter device 6 takes over the excitation of the field winding 2 of the generator 3 only in exceptional cases when the first exciter device 4 fails. In this case the excitation transformer 16 switches the generator 3 from the first exciter device 4 to the second exciter device 6.

An inverter or converter can be connected with the second exciter device 6 to invert the voltage or convert the voltage into direct current (DC) voltage for specific applications of the invention. The use of an inverter with the generator system 1 enables the use of any motor in the second exciter device 6 independent from voltage or phase outputs of the motor. The output of the second exciter device 6 is adjusted to the requirements of the field winding 2 of the generator 3 with this means.

The second exciter device 6 can comprise a pump in another example. The pump is suitable for storing mechanical energy. In the regular operation mode of the generator 3 the mechanical energy of the pump is kept on a near constant level except for losses, no energy is discharged to the generator 3 then. In malfunction mode of the generator 3 the mechanical energy of the pump is released, the mechanical energy is then converted into electrical energy by a further generator connected to the field winding 2 to excite the field winding 2. The stored mechanical energy of the pump is used to excite the generator 3 instead of the first exciter device 4. The task of the pump as a storage device is to keep the excitation current of the field winding 2 upright and safeguard the interruption-free running of the generator 3 which is of high importance for energy supply to the public grid. A part of the energy generated in the second exciter device 6 can be branched off to supply energy to other critical components of the power plant in case of malfunction, as lube pumps, monitoring devices of the power plant, or safety devices of the power plant.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

The invention claimed is:

1. A method for operating a generator, the method comprising:
exciting a field winding of a rotor of the generator by a first exciter device;
driving a motor-driven second exciter device while operating the generator with the first exciter device; and
switching from the first exciter device to the second exciter device to excite the generator in a case where the first exciter device feeds to the generator insufficient energy for operating the generator during a malfunction of the first exciter device.

2. The method according to claim 1, wherein the second exciter device operated next to the first exciter device comprises a motor-driven unipolar generator.

3. The method according to claim 2, wherein the motor-driven unipolar generator has a voltage of approximately 0.8 kV and a current of approximately 6 kA to excite the generator.

4. A generator system comprising:
a first exciter device for exciting a field winding of a rotor of a generator;
a motor-driven second exciter device for continuous operation while operating the generator; and
at least a switch for switching from the first exciter device to the second exciter device to the field winding of the generator in case of a malfunction of the generator.

5. The generator system according to claim 4, further comprising an excitation transformer operating the at least one switch, and an excitation unit, wherein via the excitation unit, the first exciter device or the second exciter device excite the generator.

6. The generator system according to claim 5, wherein the excitation unit comprises a main excitation unit and a ceiling excitation unit, the excitation transformer switching from the main excitation unit to the ceiling excitation unit during a malfunction of the first exciter device, wherein via the ceiling excitation unit, the second exciter device excites the generator.

7. The generator system according to claim 5, wherein the excitation unit comprises a main excitation unit and a ceiling excitation unit, with the excitation unit, the main excitation unit and the ceiling excitation unit each comprising at least one thyristor bridge with each thyristor of the at least one thyristor bridge of each the excitation unit, the main excitation unit and the ceiling excitation unit, connected in a parallel configuration.

8. The generator system according to claim 5, wherein the second exciter device comprises a motor-driven unipolar generator with a voltage of approximately 0.8 kV and a current of approximately 6 kA to excite the generator.

9. The generator system according to claim 4, wherein the second exciter device comprises a motor-driven flywheel for storing mechanical energy and for releasing the stored mechanical energy as electrical energy in case of a malfunction of the generator.

10. The generator system according to claim 4, wherein the second exciter device comprises a pump for storing mechanical energy and for releasing the mechanical energy converted into electrical energy in case of a malfunction of the generator.

11. A method of using the generator system according to claim 4, comprising:

exciting the field winding of the rotor of the generator using the first exciter device;
operating the motor-driven second exciter device continuously while operating the generator; and
switching via the switch from the first exciter device to the second exciter device to the field winding of the generator in a case of a malfunction of the generator.

* * * * *